(12) United States Patent
Maguire et al.

(10) Patent No.: US 10,020,475 B2
(45) Date of Patent: Jul. 10, 2018

(54) BATTERY ASSEMBLY REINFORCEMENT MEMBER

(71) Applicant: FORD GLOBAL TECHNOLOGIES, LLC, Dearborn, MI (US)

(72) Inventors: Patrick Daniel Maguire, Ann Arbor, MI (US); John Paul Gibeau, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 947 days.

(21) Appl. No.: 14/295,531

(22) Filed: Jun. 4, 2014

(65) Prior Publication Data
US 2015/0357615 A1    Dec. 10, 2015

(51) Int. Cl.
*H01M 2/10*    (2006.01)

(52) U.S. Cl.
CPC ...... *H01M 2/1077* (2013.01); *H01M 2220/20* (2013.01)

(58) Field of Classification Search
CPC .................................................. H01M 2/1077
USPC ........................................................ 429/156
See application file for complete search history.

(56) References Cited

U.S. PATENT DOCUMENTS

| | | | |
|---|---|---|---|
| 5,639,571 A * | 6/1997 | Waters | B60L 11/1874 180/68.5 |
| 8,646,790 B2 | 2/2014 | Young et al. | |
| 2003/0072994 A1 * | 4/2003 | Goushu | H01M 2/0207 429/127 |
| 2010/0173191 A1 | 7/2010 | Meintschel et al. | |
| 2011/0014501 A1 * | 1/2011 | Scheucher | B60K 1/04 429/7 |
| 2012/0003526 A1 | 1/2012 | Kume et al. | |
| 2012/0188714 A1 | 7/2012 | Von Borck et al. | |
| 2012/0282507 A1 | 11/2012 | Andre et al. | |
| 2012/0326665 A1 * | 12/2012 | Yin | B60L 11/1801 320/109 |
| 2013/0017421 A1 | 1/2013 | Onnerud et al. | |
| 2013/0022845 A1 * | 1/2013 | Davis | H01M 2/0277 429/72 |
| 2013/0071719 A1 * | 3/2013 | Chung | H01M 2/1061 429/120 |
| 2013/0341107 A1 | 12/2013 | Choo et al. | |
| 2014/0004397 A1 | 1/2014 | Lee et al. | |
| 2014/0356685 A1 * | 12/2014 | Okuda | H01M 10/5061 429/120 |

FOREIGN PATENT DOCUMENTS

| | | | | |
|---|---|---|---|---|
| JP | 2004139924 A | * | 5/2004 | |
| JP | 2008235170 A | * | 10/2008 | |
| JP | WO 2013047430 A1 | * | 4/2013 | ........ H01M 10/5061 |

OTHER PUBLICATIONS

Kasai, Masakatsu, Machine Translation of JP 2008-235170 A, Oct. 2008.*
Ogami, Etsuo, Machine Translation of JP 2004-139924 A, May 2004.*

\* cited by examiner

*Primary Examiner* — Sean P Cullen
(74) *Attorney, Agent, or Firm* — Carlson, Gaskey & Olds

(57) ABSTRACT

A battery assembly according to an exemplary aspect of the present disclosure includes, among other things, a tray, a battery array mounted to the tray, a cover positioned about the battery array and a reinforcement member disposed between the cover and the battery array.

20 Claims, 5 Drawing Sheets

BATTERY ASSEMBLY REINFORCEMENT MEMBER

TECHNICAL FIELD

This disclosure relates to a battery assembly, and more particularly, but not exclusively, to a reinforcement member for absorbing and/or transferring energy within a battery assembly during a loading event.

BACKGROUND

Electrified vehicles, such as hybrid electric vehicles (HEV's), plug-in hybrid electric vehicles (PHEV's), battery electric vehicles (BEV's), or fuel cell vehicles differ from conventional motor vehicles because they are powered by electric machines (i.e., electric motors and/or generators) instead of or in addition to an internal combustion engine. High voltage current for powering these types of electric machines is typically supplied by high voltage battery assemblies.

Electrified vehicle battery assemblies include one or more battery arrays. Each battery array includes a plurality of battery cells that are supported relative to one another. The battery arrays may be subjected to loading during vehicle testing, vehicle operation, or other loading events. The packaging of battery arrays may therefore benefit from structural energy management.

SUMMARY

A battery assembly according to an exemplary aspect of the present disclosure includes, among other things, a tray, a battery array mounted to the tray, a cover positioned about the battery array and a reinforcement member disposed between the cover and the battery array.

In a further non-limiting embodiment of the foregoing battery assembly, the reinforcement member is L-shaped and extends between a wall of the cover and the battery array.

In a further non-limiting embodiment of either of the foregoing battery assemblies, the reinforcement member is T-shaped and extends between the cover and the battery array and between the battery array and a second battery array.

In a further non-limiting embodiment of any of the foregoing battery assemblies, a plurality of reinforcement members are positioned between the cover and the battery array.

In a further non-limiting embodiment of any of the foregoing battery assemblies, the reinforcement member is made of a high density foam.

In a further non-limiting embodiment of any of the foregoing battery assemblies, the reinforcement member is made of an expandable foam.

In a further non-limiting embodiment of any of the foregoing battery assemblies, the reinforcement member is made of a non-foamed polymer.

In a further non-limiting embodiment of any of the foregoing battery assemblies, the reinforcement member is made of rubber.

In a further non-limiting embodiment of any of the foregoing battery assemblies, the reinforcement member is mounted to at least one of the cover and the battery array.

In a further non-limiting embodiment of any of the foregoing battery assemblies, the reinforcement member is mounted to the cover but spaced from the battery array.

In a further non-limiting embodiment of any of the foregoing battery assemblies, the reinforcement member is a loosely fitted structure positioned between the cover and the battery array.

In a further non-limiting embodiment of any of the foregoing battery assemblies, the reinforcement member is at least as wide as the battery array.

A battery assembly according to another exemplary aspect of the present disclosure includes, among other things, a first battery array, a second battery array and a cover positioned about the first battery array and the second battery array. A reinforcement member extends between the first battery array and the second battery array or between the cover and at least one of the first battery array and the second battery array.

In a further non-limiting embodiment of the foregoing battery assembly, the reinforcement member is positioned near a centerline of the first battery array and the second battery array.

In a further non-limiting embodiment of either of the foregoing battery assemblies, the reinforcement member includes a first portion that extends between the first battery array and the second battery array, and a second portion that extends between the cover and the at least one of the first battery array and the second battery array.

In a further non-limiting embodiment of any of the foregoing battery assemblies, a second reinforcement member is disposed between the cover and at least one the first battery array and the second battery array.

A method according to another exemplary aspect of the present disclosure includes, among other things, positioning a reinforcement member between a cover and a battery array and transferring a first portion of a load applied to the battery array from the battery array, through the reinforcement member, and then to the cover.

In a further non-limiting embodiment of the foregoing method, the method includes absorbing a second portion of the load with the reinforcement member.

In a further non-limiting embodiment of either of the foregoing methods, the positioning step occurs after the cover is mounted over the battery array.

In a further non-limiting embodiment of any of the foregoing methods, the method includes injecting a material into an expandable bag attached to the cover after the cover is mounted over the battery array to form the reinforcement member.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a battery assembly for an electrified vehicle. The battery assembly includes at least one battery array and a cover positioned over and/or beside the battery array. A reinforcement member may be disposed between the cover and the battery array for absorbing and/or transferring energy from the battery array in response to a loading event. These and other features are discussed in greater detail herein.

Figure 1:
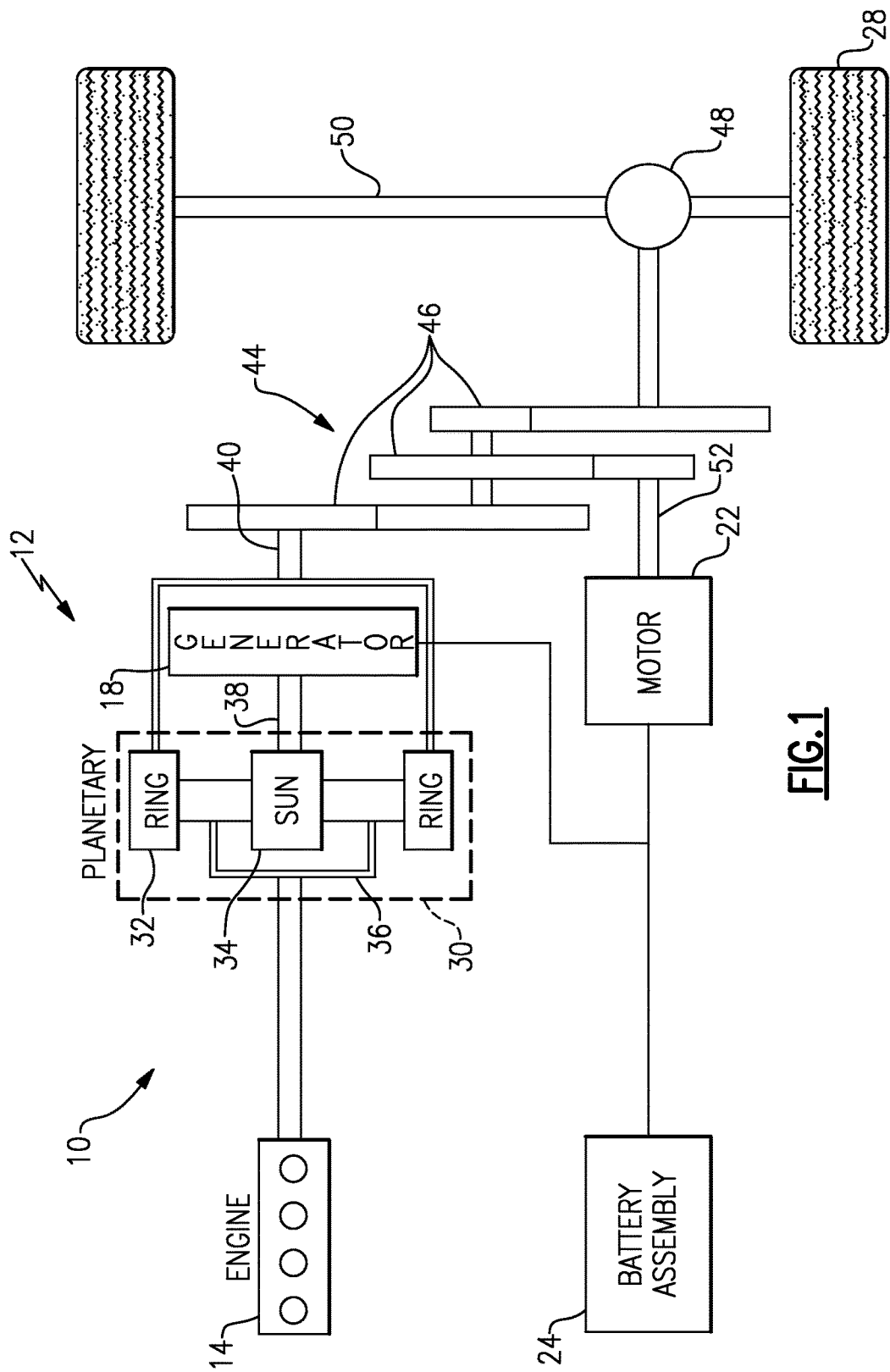
FIG. 1 schematically illustrates a powertrain of an electrified vehicle.

FIG. 1 schematically illustrates a powertrain 10 for an electrified vehicle 12. Although depicted as a HEV, it should be understood that the concepts described herein are not limited to HEV's and could extend to other electrified vehicles, including, but not limited to, PHEV's and BEV's.

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12.

The engine 14, which may include an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an example type of electrified vehicle battery assembly. The battery assembly 24 may include a high voltage battery pack that is capable of outputting electrical power to operate the motor 22 and the generator 18. Other types of energy storage devices and/or output devices can also be used to electrically power the electrified vehicle 12.

Figure 2:
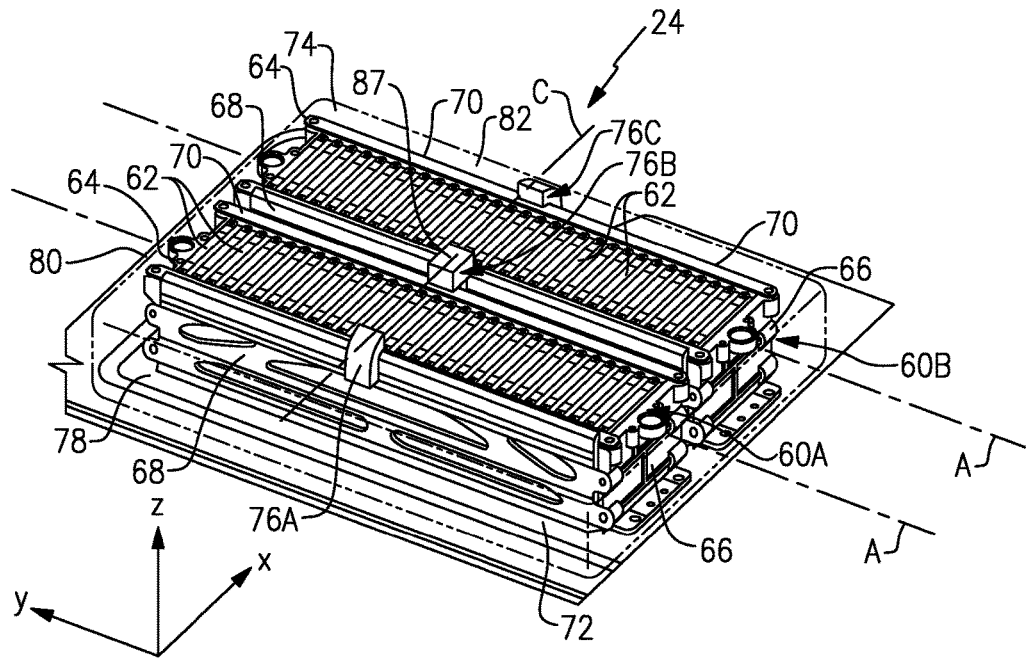
FIG. 2 illustrates a battery assembly of an electrified vehicle.
Figure 3:
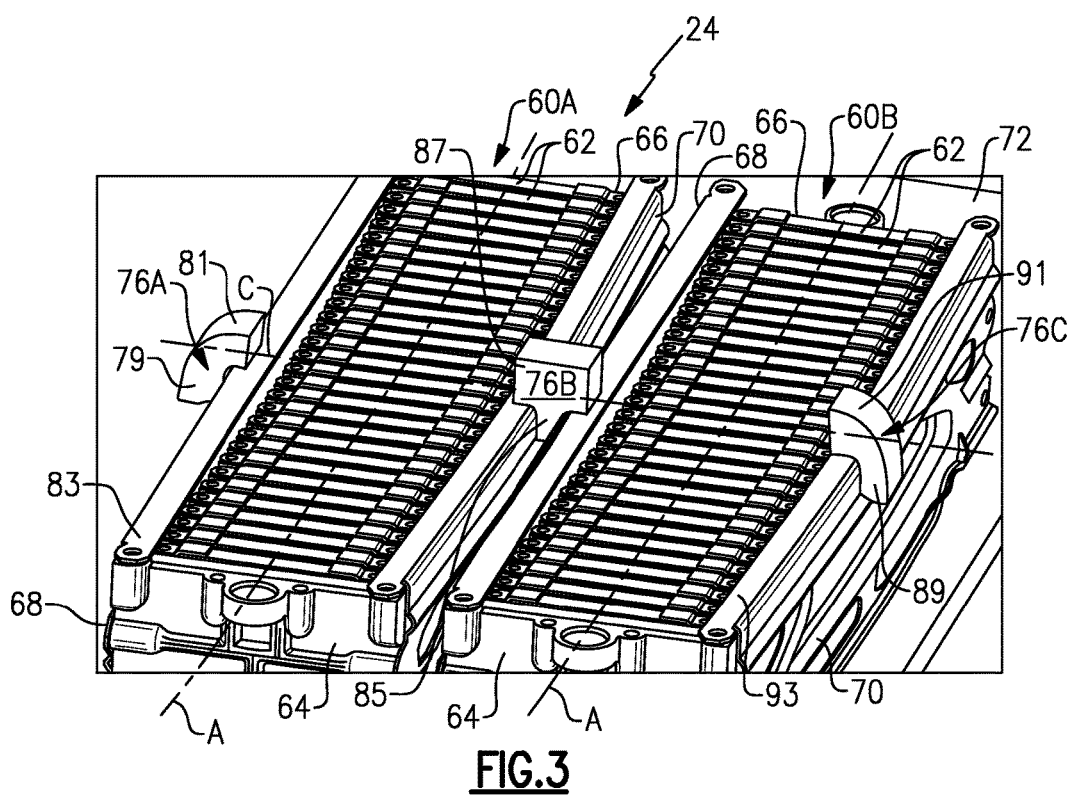
FIG. 3 illustrates the battery assembly of FIG. 2 with a cover of the assembly removed.

FIGS. 2 and 3 illustrate a battery assembly 24 that can be incorporated into an electrified vehicle, such as the electrified vehicle 12 of FIG. 1. The battery assembly 24 may include one or more battery arrays. Two battery arrays 60A, 60B are depicted in the illustrated embodiment. However, this disclosure is not limited to any specific number of battery arrays.

Each battery array 60A, 60B may include a plurality of battery cells 62. The battery cells 62 are disposed along a longitudinal axis A between opposing end plates 64, 66. Side rails 68, 70 are disposed on each side of the battery cells 62 between the end plates 64, 66. The battery cells 62 are held in position by the end plates 64, 66 and the side rails 68, 70.

The battery arrays 60A, 60B may be mounted to a tray 72 of the battery assembly 24. In one embodiment, fasteners are inserted through openings in the end plates 64, 66 to secure the battery arrays 60A, 60B to the tray 72.

The battery assembly 24 may additionally include a cover 74 that can be attached to the tray 72 to cover the battery arrays 60A, 60B. The cover 74 is shown in phantom in FIG. 2 and is removed in FIG. 3 to better illustrate the interior features of the battery assembly 24. The tray 72 and the cover 74 establish an enclosure that houses the various hardware and electronics of the battery assembly 24, including but not limited to the battery arrays 60A, 60B. The cover 74 may be attached to the tray 72 in any known manner. In one non-limiting embodiment, the cover 74 is bolted to the tray 72.

One or more reinforcement members 76 may be disposed between the cover 74 and each battery array 60A, 60B. In the illustrated embodiment, the battery assembly 24 employs three reinforcement members 76A, 76B and 76C. However, the battery assembly 24 could include only a single reinforcement member (see, for example, the reinforcement member 176 of FIG. 5) or any other number of reinforcement members.

In one non-limiting embodiment, the reinforcement members 76A, 76B and 76C are positioned near a centerline C of the battery arrays 60A, 60B. In one embodiment, the centerline C is transverse to the longitudinal axis A. Although located near the centerline C in this embodiment, the reinforcement members 76A, 76B and 76C could be positioned anywhere along the length of the battery arrays 60A, 60B.

In the illustrated non-limiting embodiment, the reinforcement member 76A is L-shaped and is disposed between a side wall 78 of the cover 74 and the side rail 68 of the battery array 60A. A first portion 79 of the reinforcement member 76A extends along the side rail 68 of the battery array 60A and a second portion 81 that is transverse to the first portion 79 extends along a top surface 83 of the side rail 68 (see FIG. 3).

The reinforcement member 76B may be T-shaped and can be positioned to extend between the battery arrays 60A, 60B as well as between the battery arrays 60A, 60B and a top wall 80 of the cover 74. For example, a first portion 85 of the reinforcement member 76B may extend between the side rail 70 of the battery array 60A and the side rail 68 of the battery array 60B (see FIG. 3), and a second portion 87 of the reinforcement member 76B may extend between the battery arrays 60A, 60B and the top wall 80 of the cover 74 (see FIG. 2). The first portion 85 may extend in part along only a portion of the side of the battery arrays 60A, 60B or could extend all the way down to the surface supporting the battery arrays 60A, 60B.

In another embodiment, the reinforcement member 76B need not be T-shaped. For example, the reinforcement member 76B could be configured as a foam wall that simply extends between the battery arrays 60A, 60B.

The reinforcement member 76C is similar to the reinforcement member 76A. In one embodiment, the reinforcement member 76C is L-shaped and extends between a sidewall 82 of the cover 74 and the side rail 70 of the battery array 60B. A first portion 89 of the reinforcement member 76CA extends along the side rail 70 of the battery array 60B and a second portion 91 that is transverse to the first portion 89 extends along a top surface 93 of the side rail 70. Various other shapes and configurations of the reinforcement members 76A, 76B and 76C are also contemplated as is further discussed below.

The reinforcement members 76A, 76B and 76C may be made of a variety of materials. In one embodiment, the reinforcement members 76A, 76B and 76C are made of high density foam. In another embodiment, the reinforcement members 76A, 76B and 76C are made of a resilient plastic, such as a high density polyethylene (HDPE). In another embodiment, the reinforcement members 76A, 76B and 76C are made of an insulator material. In yet another embodiment, the reinforcement members 76A, 76B and 76C are made of an elastomeric rubber. In yet another embodiment, the reinforcement members 76A, 76B and 76C are made of a non-foamed polymer. The material used to form the reinforcement members 76A, 76B and 76C could also act as a conductor, or the cover 74 could include an insulating material.

The reinforcement members 76A, 76B and 76C are configured to absorb and/or transfer loads that are applied to the battery assembly 24 or developed from the battery assembly 24 due to inertial effects. For example, during vehicle operation or vehicle testing, the battery assembly 24 may be subjected to a loading event in which a load is applied to the battery assembly 24 or an inertial load is developed along the X-axis or the Z-axis (see FIG. 2). When these loads are applied, the battery arrays 60A, 60B of the battery assembly 24 may engage one or more of the reinforcement members 76A, 76B and 76C to restrict the amount of deformation that occurs along the X-axis or the Z-axis.

By way of one non-limiting example, such as when a load is applied along the positive X-axis, the battery array 60B may engage the reinforcement member 76C. A first portion of the load may be absorbed by the reinforcement member 76C, and a second portion of load may be transferred through the reinforcement member 76C into the cover 74 to help withstand the force and reduce the amount of bending experienced by the battery array 60B.

In response to the same load, the battery array 60A may engage the reinforcement member 76B. The reinforcement member 76B may similarly absorb some of the load and transfer another portion of the load into the cover 74 and/or onto the battery array 60B.

In another embodiment, such as when a load is applied along the negative X-axis, the reinforcement member 76A may be engaged by the battery array 60A and the reinforcement member 76B may be engaged by the battery array 60B to absorb and/or transfer energy. In yet another embodiment, loads applied along the positive Z-axis may be absorbed and/or transferred into the cover 74 through portions of the reinforcement members 76A, 76B and 76C that are disposed between the battery arrays 60A, 60B and the cover 74.

The material make-up of one or more of the reinforcement members 76A, 76B and 76C can be tailored to either absorb more energy or transfer more energy in response to one or more of the loadings events described above. For example, a more rigid reinforcement member may be provided to transfer more of the energy generated during the loading event, whereas a less rigid reinforcement member may be provided to absorb more of the energy. Similarly, a more resilient member may recover its shape to a pre-loaded state after the load, whereas a more deforming member may absorb the energy of the load and not recover fully to its original shape.

Figure 4A:
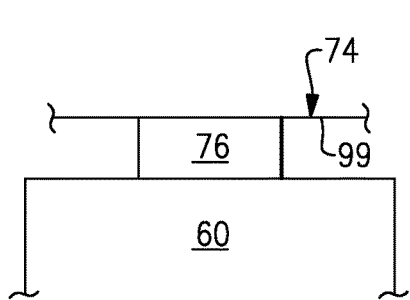
FIGS. 4A, 4B, 4C, 4D and 4E illustrate exemplary configurations of a battery assembly reinforcement member.

FIGS. 4A, 4B, 4C, 4D and 4E illustrate various alternative configurations of a reinforcement member 76 that can be employed within a battery assembly 24. Referring first to FIG. 4A, the reinforcement member 76 is mounted to the cover 74 (and/or a battery array 60) and extends between a wall 99 of the cover 74 and the battery array 60. The wall 99 could be either a top wall or a side wall of the cover 74. The reinforcement member 76 may just contact the battery array 60 when the cover 74 is placed over the battery array 60, or can be designed to establish an interference fit between the cover 74 and the battery array 60. The reinforcement member 76 may limit the upwards motion of the battery array 60 by resisting compression, and may limit the sideways motion of the battery array 60 by resisting shear.

Figure 4B:
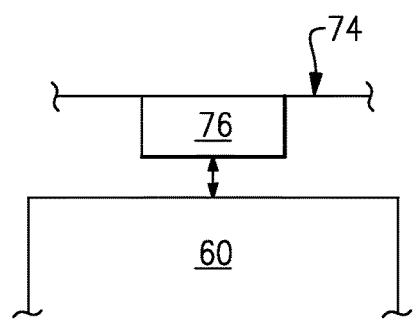

Referring to FIG. 4B, the reinforcement member 76 may be spaced from the battery array 60 such that it is not in contact with the battery array 60 during non-loading events. In this embodiment, the reinforcement member 76 is in relative close proximity to the battery array 60 such that if the battery array 60 begins to bend under a load, the reinforcement member 76 is quickly engaged to absorb and/or transfer energy into the cover 74.

Figure 4C:
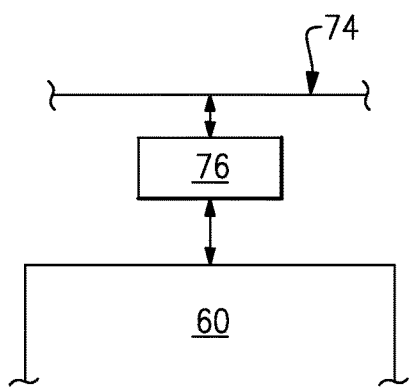
Figure 4D:
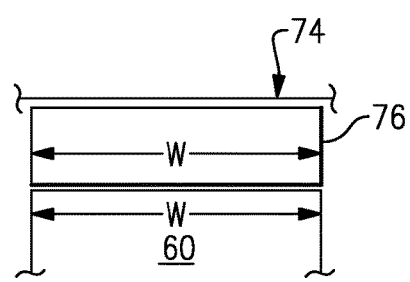
Figure 4E:
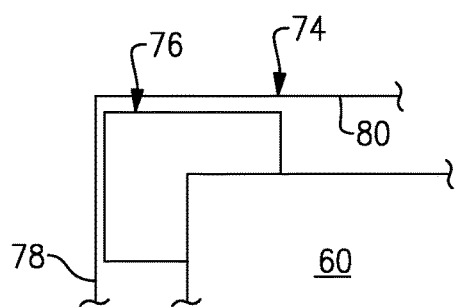

The reinforcement member 76 could alternatively be a free floating structure positioned between the cover 74 and the battery array 60 (see FIG. 4C). In other words, the reinforcement member 76 may be loosely fitted and not positively retained to any structure but bound in place by the presence of one or more structures. The reinforcement member 76 can also be designed such that it includes a width W that is equivalent to the width of the battery array 60 (see FIG. 4D). In yet another embodiment, the reinforcement member 76 may be configured such that it extends between both a side wall 78 of the cover 74 and the battery array 60 and a top wall 80 of the cover 74 and the battery array 60 (see FIG. 4E).

It should be understood that the embodiments of FIGS. 4A-4E are not mutually exclusive. For example, the embodiments of FIGS. 4A-4C could be combined with the embodiment of FIG. 4D, which may be combined with the embodiment of FIG. 4E in any combination.

Figure 5:
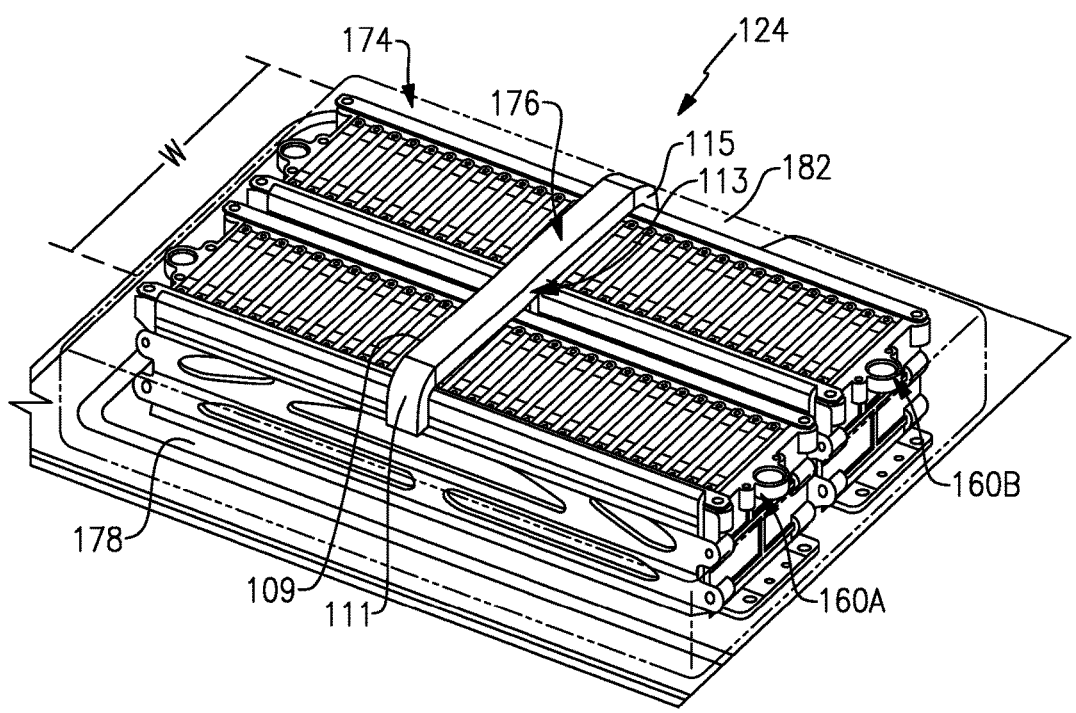
FIG. 5 illustrates a battery assembly according to another embodiment of this disclosure.

FIG. 5 illustrates a battery assembly 124 according to another exemplary embodiment of the disclosure. In this disclosure, like reference numbers designate like elements where appropriate and reference numerals with the addition of 100 or multiples thereof designate modified elements that are understood to incorporate the same features and benefits of the corresponding original elements.

In this embodiment, the battery assembly 124 includes a single reinforcement member 176. The reinforcement member 176 may extend across a width W that spans both a first battery array 160A and a second battery array 160B, or multiple arrays. The reinforcement member 176 is disposed between a cover 174 (shown in phantom) and the first battery array 160A and the second battery array 160B. The reinforcement member 176 may include a body 109 having a first leg 111, a second leg 113, and a third leg 115. In one embodiment, the first leg 111 extends between a side wall 178 of the cover 174 and the first battery array 160A, the second leg 113 extends between the first battery array 160A and the second battery array 160B, and the third leg 115 extends between a side wall 182 of the cover 174 and the second battery array 160B.

Figure 6:
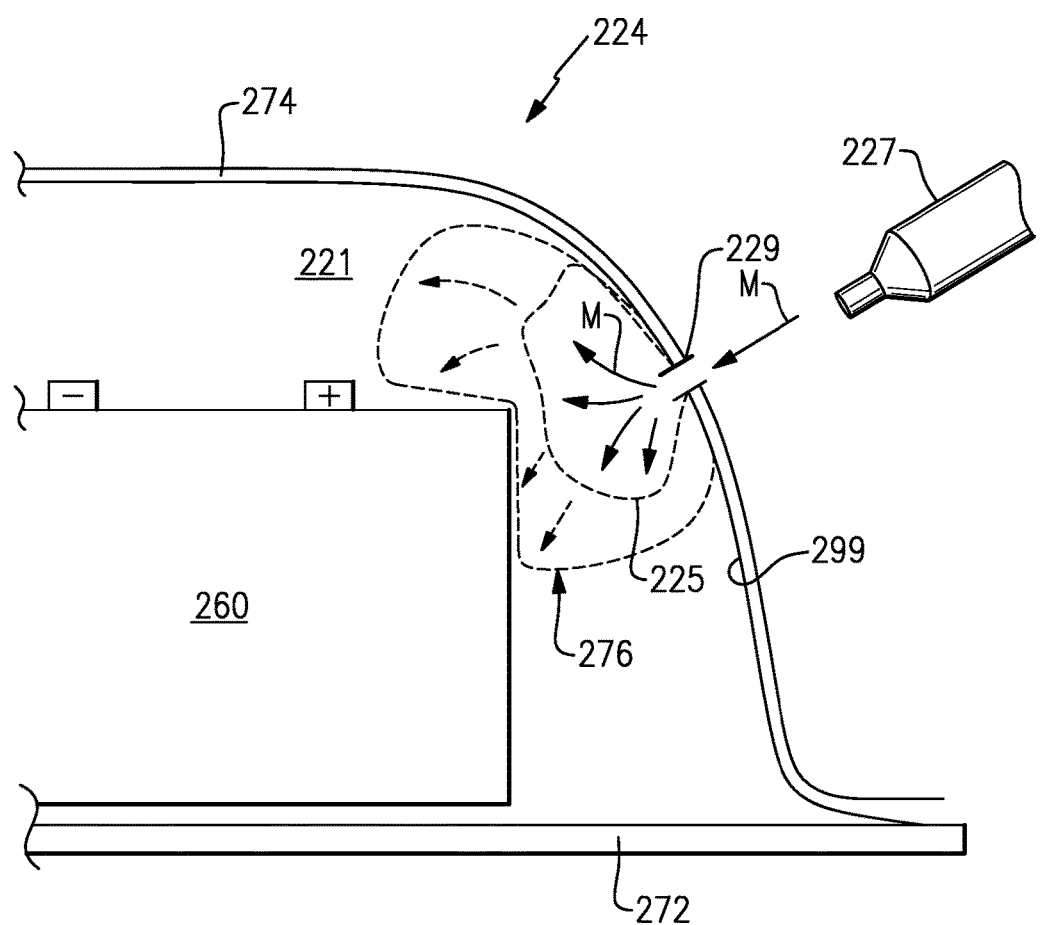
FIG. 6 illustrates a battery assembly according to yet another embodiment of this disclosure.

FIG. 6 illustrates yet another battery assembly 224. In this embodiment, a cover 274 is positioned over a battery array 260 and mounted to a tray 272 without any reinforcement member in place between the cover 274 and the battery array 260. A cavity 221 extends between the battery array 260 and a wall 299 of the cover 274. The cavity 221 defines a space for forming a reinforcement member inside the battery assembly 224 after the cover 274 has been mounted to the tray 272 (i.e., after the cover 274 has been positioned over the battery array 260).

An expandable bag 225 may be attached to the cover 274. A material M may be injected into the expandable bag 225 with a tool 227 through an aperture 229 formed through a wall 299 in order to fill the expandable bag 225. In one embodiment, the material M includes an expandable foam. In another embodiment, the material M includes a non-foaming, resilient polymer. As the expandable bag 225 expands, it reduces the size of the cavity 221. In one embodiment, the material M may cure within the expandable bag 225 to form a reinforcement member 276 between the cover 274 and the battery array 260.

The reinforcement member 276 may alternatively be formed by inserting the material M into the expandable bag 225 just prior to mounting the cover 274 to the tray 272 such that the material M is still formable during the assembly but later cures to a rigid or semi-rigid state. In another embodiment, the expandable bag 225 may be filled with a compound that is formable, but later cures to a desired rigidity. The expandable bag 225 could also be filled with one or more compounds that are mixed together upon placement of the cover 274 over the batter array 260. The compounds may then chemically react with one another and cure to form a rigid or semi-rigid reinforcement member. The expandable bag 225 could alternatively be filled with a liquid that does not cure but enables load transfer from the battery array 260 to the cover 274 by developing pressure within the fluid filled bag.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery assembly, comprising:
   a tray;
   a battery array atop said tray;
   a cover positioned about said battery array; and
   a foam reinforcement member disposed between said cover and said battery array, wherein said foam reinforcement member is T shaped and extends between said cover and said battery array and between said battery array and a second battery array.

2. The battery assembly as recited in claim 1, comprising a plurality of reinforcement members positioned between said cover and said battery array.

3. The battery assembly as recited in claim 1, wherein said foam reinforcement member is made of an expandable foam.

4. The battery assembly as recited in claim 1, wherein said foam reinforcement member is mounted to at least one of said cover and said battery array.

5. The battery assembly as recited in claim 1, wherein said foam reinforcement member is mounted to said cover but spaced from said battery array.

6. The battery assembly as recited in claim 1, wherein said foam reinforcement member is a loosely fitted structure positioned between said cover and said battery array.

7. The battery assembly as recited in claim 1, wherein said foam reinforcement member is at least as wide as said battery array.

8. The battery assembly as recited in claim 1, wherein the foam reinforcement member extends across a width that spans both said battery array and said second battery array.

9. The battery assembly as recited in claim 1, wherein a leg of said foam reinforcement member extends a distance between said battery array and said second battery array, and said distance is less than a total height of said battery array and said second battery array.

10. A battery assembly, comprising:
    a first battery array;
    a second battery array axially adjacent to the first battery array;
    a cover received over said first battery array and said second battery array; and
    a reinforcement member disposed between said cover and each of said first battery array and said second battery array and extending across a width that spans both said first battery array and said second battery array;
    wherein the reinforcement member includes a leg extending a distance between the first battery array and the second battery array, and the distance is less than a total height of the first battery array and the second battery array.

11. A battery assembly, comprising:
    a tray;
    a battery array received on said tray;
    a cover positioned over said battery array;
    an expandable bag attached to said cover; and
    an expandable foam received within said expandable bag, wherein said expandable bag and said expandable foam together establish a reinforcement member between said battery array and said cover.

12. A battery assembly, comprising:
    a first battery array;
    a second battery array;
    a cover positioned about said first battery array and said second battery array;

a first foam reinforcement member disposed axially between said first battery array and said second battery array;

a separate second reinforcement member disposed between said cover and said first battery array; and a separate third reinforcement member disposed between said cover and said second battery array.

13. The battery assembly as recited in claim 12, wherein said first foam reinforcement member is positioned along a centerline of said first battery array and said second battery array.

14. The battery assembly as recited in claim 12, wherein said first foam reinforcement member includes a first portion that extends between said first battery array and said second battery array, and a second portion that extends between said cover and at least one of said first battery array and said second battery array.

15. The battery assembly as recited in claim 12, wherein at least one of said second reinforcement member and said third reinforcement member is made of foam.

16. The battery assembly as recited in claim 12, wherein said first foam reinforcement member is T-shaped and said second and third reinforcement members are each L-shaped.

17. A method, comprising:

positioning a reinforcement member such that a first portion of the reinforcement member extends between a side wall of a cover and a battery array and a second portion of the reinforcement member extends between a top wall of the cover and the battery array; and positioning a second reinforcement member axially between the battery array and a second battery array;

wherein the second reinforcement member is separate from the reinforcement member.

18. The method as recited in claim 17, wherein the positioning step occurs after the cover is mounted over the battery array.

19. The method as recited in claim 17, comprising injecting a material into an expandable bag attached to the cover after the cover is mounted over the battery array to form the reinforcement member.

20. The method as recited in claim 17, wherein the reinforcement member is a foam reinforcement member.

* * * * *